Nov. 28, 1939.   C. D. PETERSON   2,181,627
SHIFTING MECHANISM FOR CHANGE-SPEED TRANSMISSION GEARING
Filed Nov. 30, 1938   2 Sheets-Sheet 1

INVENTOR.
BY Carl D. Peterson
Bodell & Thompson
ATTORNEYS.

INVENTOR.
Carl D. Peterson
BY Bodell & Thompson
ATTORNEYS.

Patented Nov. 28, 1939

2,181,627

UNITED STATES PATENT OFFICE 2,181,627

SHIFTING MECHANISM FOR CHANGE-SPEED TRANSMISSION GEARING

Carl D. Peterson, Toledo, Ohio

Application November 30, 1938, Serial No. 243,231

4 Claims. (Cl. 74—475)

This invention relates to shifting mechanisms for change-speed transmission gearings, and has for its object an assembly of a shift rod and plurality of shifting elements as forks mounted thereon by which axial shifting movement of the rod out of and into neutral shifts one element or fork only and shifting of the rod out of neutral in the opposite direction and back to neutral shifts only the other element or fork.

It also has for its object means which couples the fork being shifted to the rod and positively locks the unshifted fork from shifting movement.

The invention consists in the novel features and in the combinations and constructions hereinafter set forth and claimed.

In describing this invention, reference is had to the accompanying drawings in which like characters designate corresponding parts in all the views.

Figure 1:
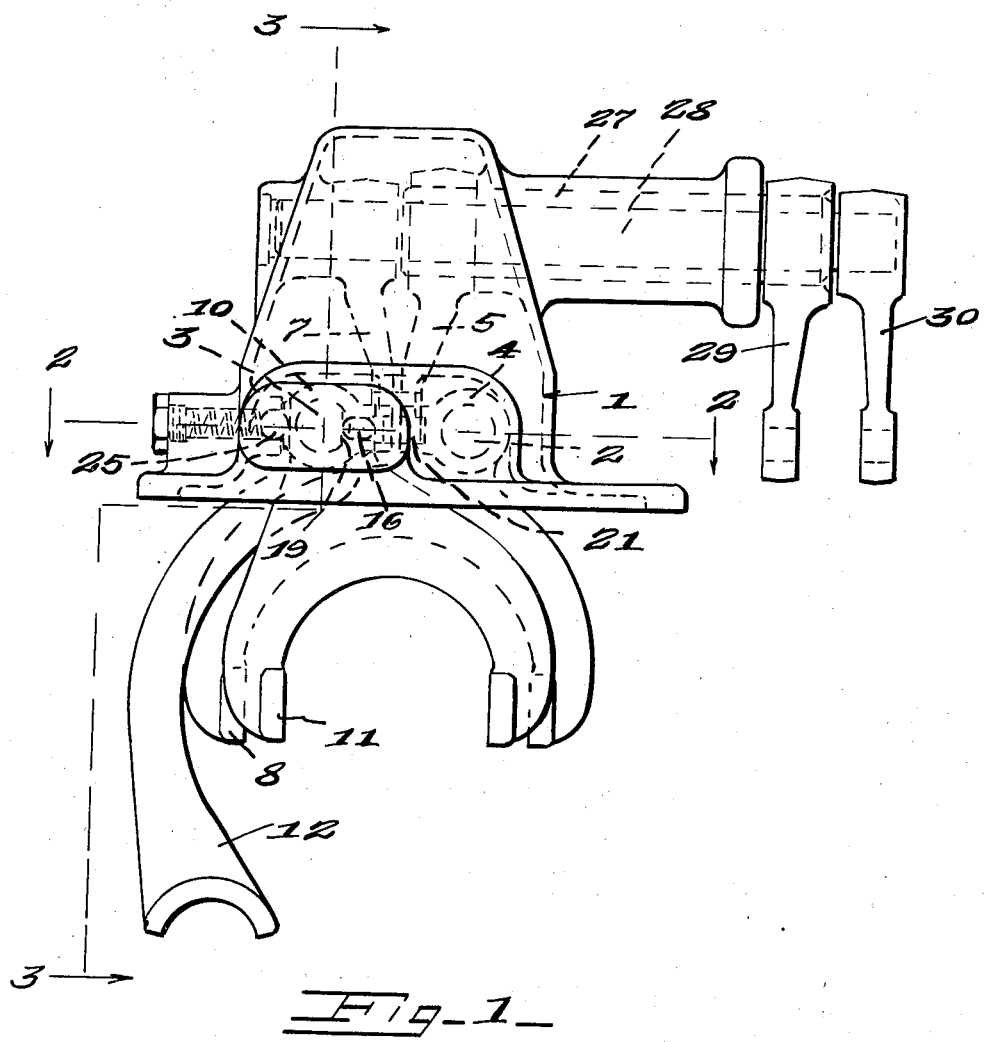
Figure 1 is an elevation of the shifting mechanism embodying this invention.

The shifting mechanism here illustrated is for shifting the shiftable elements, gears or clutches, of a three speed forward and reverse transmission gearing, and the shifting mechanism comprises an axially movable shift rod mounted in a suitable support or housing and shiftable in opposite directions from neutral to effect two of the speeds, shifting forks having hubs or blocks slidably mounted on the rod and movable by the rod in opposite directions, relative to each other, out of and into neutral position, means for locking either of the hubs to the rod to shift therewith out of neutral and back to neutral, and locking the other hub from shifting movement with the rod, and means for shifting the rod.

1 designates a support or housing which is usually the cover of the gear box not shown. 2, 3 designate, respectively, shift rods slidably mounted in the housing 1, the rod 2 having a block 4 thereon for coacting with a shifting arm 5, the rod 3 having a similar block 6 coacting with the shifting arm 7. Each of these rods is operable to produce two speeds, the rod 3 being operable to produce first speed forward and reverse, and the rod 2 to produce second and third speeds forward.

In the illustrated embodiment of my invention, the shifting forks to produce first speed forward and reverse have hubs slidably mounted on the rod 3, movable in opposite directions relative to each other out of and into neutral position, one fork or hub being locked to the rod 3 during the shifting thereof out of and into neutral position, while the other fork or hub is locked in neutral position from movement with the rod. The block 4 is the hub of a fork 8.

9, 10 designate respectively the hubs of forks 11 and 12 which operate shiftable elements of the gearing in the gear box to produce low and reverse speed, these being slidably mounted on the rod 3, so that the rod 3 can shift relatively thereto, except when either one or the other of the hubs 9 or 10 is locked to the rod 3.

13 designates a stop or shoulder fixed relatively to the rod 3 and extending between opposing ends of the hubs 9, 10 to limit the movement of the hubs in neutral position, when being returned to neutral position and also holding either of them from movement with the rod when the other hub is being shifted out of neutral position. Preferably, a shoulder, as a collar 14, is provided on the rod between the opposing ends of the hubs 9, 10 to be engaged thereby when both hubs 9, 10 are in neutral position, this shoulder 14 pushing against the hub 9 or 10 to be shifted, when the shift rod 3 is moved in one direction or the other. The stop 13 then prevents the other hub 10 from being shifted.

Locking means is provided for locking the hub 9 or 10 to the rod 3 when being shifted out of or back into neutral position, and for positively locking the unshifted hub from movement with the rod 3, particularly when the rod 3 and shifted hub are being returned to neutral position.

15 and 16 designate respectively the locking members for the hubs 9, 10 respectively, these being here shown as radially movable slides or bolts having rounding ends 17 and 18 coacting respectively with notches 19 and 20 in the rod 3 and in a part fixed in the housing from movement with the rod 3. As here shown, the notches 20 are provided in a member or plate 21 secured in the housing, the plate being also formed with the shoulder 13. The notches are of such shape as to act cam-fashion to force the ends of the radially movable locking member 15 or 16 inwardly or outwardly, when the rod 3 is shifted. The locking member 15 or 16 is of such radial length that only one of the rounding ends projects beyond the periphery or the wall of the bore of the hub 9, 10. When the outer end of the member 15 or 16 projects beyond the periphery of the hub 9 or 10 into the notch 20, the hub is locked from movement with the rod. When the inner end of the member 15 or 16 projects into the bore of the hub 9 or 10 into the notch 19, the hub is locked to the rod 3.

Figure 2:
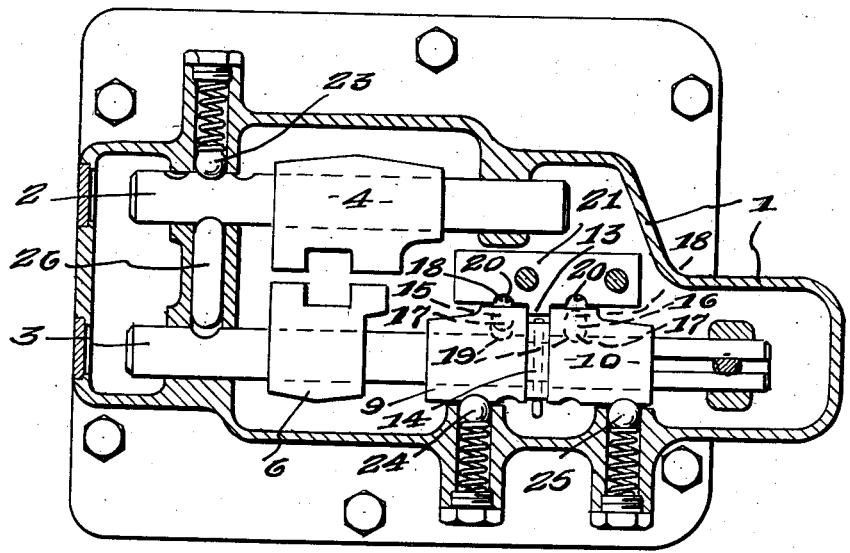
Figure 2 is a sectional view on the plane of line 2—2, Figure 1.
Figure 3:
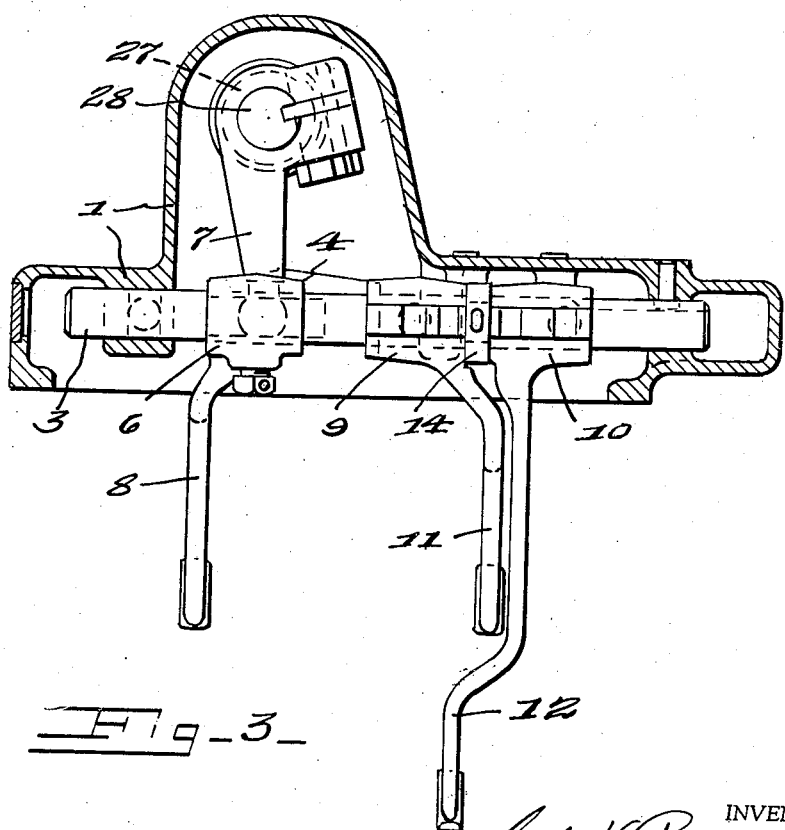
Figure 3 is a sectional view, partly in elevation, on line 3—3, Figure 1.

The rod 3, when shifted, causes one locking member 15 or 16 to be cammed inwardly and the other locking member to be cammed outwardly, in accordance with the direction of movement of the rod 3 from neutral. Movement of the rod 3 to the left from neutral (Figure 2) causes the shoulder 14 to push against the hub 9 and move the hub 9 to the left, and hence carry the locking member 15 therewith, causing the upper end of the locking member to be cammed out of its companion notch 20 and interlocked in the companion notch 19 of the rod 3, and hence lock the hub 9 to the rod 3. During this movement of the rod 3 to the left, the hub 10 is held from movement with the rod by the shoulder 13, and hence the movement of the rod 3 causes the locking member 16 to be thrust outwardly into interlocking engagement with the companion notch 20, so that the hub 10 is held from shifting movement with the rod, particularly when the rod 3 is returned to neutral position. The corresponding operation takes place to lock the hub 9 from movement, while the hub 10 is being shifted, when the rod 3 is shifted to the right (Figure 2) from neutral.

Suitable means, as a spring-pressed poppet 23, is provided for locating the shift rod 2 in neutral and shifted positions; similar means 24, 25 co-acting with the hubs 9, 10 are provided for locating them in neutral and shifted positions. Also, a suitable locking device, as 26, between the shift rods 2, 3 is provided for locking either rod from movement when the other rod is shifted.

In the illustrated embodiment of this shifting mechanism, the rods 2, 3 or the blocks 4, 6 are operated by the arms 5, 7 which are mounted respectively on a sleeve or hollow rock shaft 27 suitably mounted in the housing 1 and a rock shaft 28 within the sleeve 27, the rock shaft 28 extending at its inner and outer ends beyond the sleeve 27. Suitable arms 29 and 30 are mounted respectively on the outer ends of the sleeve 27 and the shaft 28, for connection to a gear shifting lever having a selecting and shifting movement.

In operation, when the gear shifting lever is operated to select the shift rod 3 and operated in such direction as to shift the rod 3 to the left (Figure 2), the hub 9 and its fork 11 will be moved to the right while the hub 10 and its fork 12 will be locked in neutral position, as before described, and during return movement of the rod 3 to the right (Figure 2) to neutral position, the hub 10 remains locked in neutral position and does not shift to the right out of neutral position. Upon movement of the shaft 28 by the shifting lever to cause the arm 7 to shift the rod 3 in the opposite direction or to the right from neutral, the hub 9 is held from shifting movement with the rod 3, while the hub 10 is being shifted to the right, and the hub 10 locked during this movement to the rod 3. During return movement of the hub 10 to neutral position, that is, to the left (Figure 2), the hub 9 is held locked by its locking member 15 from shifting movement, and the hub 10 remains locked to the rod 3. When both hubs 9, 10 are in neutral position, movement of the rod 3 in one direction or the other from neutral will lock either hub 9, 10 to the rod 3 and lock the other hub 9 or 10 from movement with the rod 3.

What I claim is:

1. A shifting mechanism comprising a suitable housing, an axially shiftable rod mounted in the housing and shiftable in opposite directions from neutral, shifting elements having hubs slidably mounted on the rod and movable in opposite directions relative to each other out of and into neutral position by the rod, locking means including parts controlled in their operation by the rod for locking either hub to the rod to shift therewith and for locking the other hub in neutral position while the former hub is being shifted out of and into neutral position, and stop means for limiting the movement of the hubs in neutral when returning from shifted position to neutral position.

2. A shifting mechanism comprising a suitable housing, an axially shiftable rod mounted in the housing and shiftable in opposite directions from neutral, shiftable elements having hubs slidably mounted on the rod and movable by the rod in opposite directions relative to each other out of and into neutral position, locking means including parts controlled in their operation by the rod to lock either hub to the rod to shift therewith and to lock the other hub in neutral position while the former hub is being shifted out of and into neutral position, stop means for limiting the movement of the hubs in neutral position when returning from shifted position to neutral position, and a shoulder on the rod against which opposing ends of the hubs abut when in neutral position.

3. A shifting mechanism comprising a suitable housing, an axially shiftable rod mounted in the housing and shiftable in opposite directions from neutral, shifting elements having hubs slidably mounted on the rod and movable by the rod in opposite directions relative to each other out of and into neutral position, stop means for limiting the movement of the hubs in neutral when returning from shifted to neutral position, and means operated by the shifting of the rod out of neutral position in either direction for locking either hub to the rod in accordance with the direction of the shifting movement of the rod from neutral, and locking the other unshifted hub in neutral position.

4. A shifting mechanism comprising a suitable housing, an axially shiftable rod mounted in the housing and shiftable in opposite directions from neutral, shifting elements having hubs slidably mounted on the rod and movable in opposite directions relatively to each other out of and into neutral position, a stop for limiting the movement of the hubs in neutral position when returning from shifted to neutral position, a shoulder on the rod abutting against the opposing ends of the hubs when in neutral position, and a radially movable locking member in each hub, the rod having a notch for receiving each locking member, means fixed from movement with the rod and having a notch alined with the notches of the rod when the rod and hubs are in neutral position, each notch and the companion locking member being formed to shift the locking member radially upon axial shifting movement of the rod in one direction or the other and operating to shift one locking member inwardly into interlocking engagement with the rod and the other locking member out of interlocking engagement with the rod and into interlocking engagement with its companion notch, in accordance with the direction of the axial movement of the rod from neutral.

CARL D. PETERSON.